United States Patent
Kempas

[19]

[11] Patent Number: 5,977,536
[45] Date of Patent: Nov. 2, 1999

[54] ALL-AROUND OBSERVATION DEVICE HAVING A ROTATABLE OBJECTIVE ELEMENT

[75] Inventor: Hagen Kempas, Überlingen, Germany

[73] Assignee: Bodenseewerk Geratetechnik GmbH, Uberlingen, Germany

[21] Appl. No.: 08/964,661

[22] Filed: Nov. 5, 1997

[30] Foreign Application Priority Data

Nov. 5, 1996 [DE] Germany ............................ 196 45 573

[51] Int. Cl.$^6$ ........................................................ H01J 3/14
[52] U.S. Cl. ........................... 250/216; 250/236; 359/216
[58] Field of Search .................................... 250/216, 234, 250/235, 239, 236; 359/210, 216–219; 356/237.1

[56] References Cited

U.S. PATENT DOCUMENTS

| | | | |
|---|---|---|---|
| 4,639,589 | 1/1987 | Weber et al. ............................ | 250/236 |
| 4,984,892 | 1/1991 | Hofmann ................................. | 356/372 |
| 5,006,705 | 4/1991 | Saito et al. ............................... | 250/235 |
| 5,365,288 | 11/1994 | Dewald et al. .......................... | 359/223 |

FOREIGN PATENT DOCUMENTS

| | | |
|---|---|---|
| 0 130 869 A1 | 1/1985 | European Pat. Off. . |
| 0402601 | 4/1990 | European Pat. Off. . |
| 0629890 B1 | 6/1994 | European Pat. Off. . |
| 0 629 890 A1 | 12/1994 | European Pat. Off. . |
| 3212729A1 | 4/1982 | Germany . |
| 37 31 844 A1 | 3/1989 | Germany . |
| 2196441 | 2/1984 | United Kingdom . |
| 2169441 | 4/1988 | United Kingdom . |

*Primary Examiner*—Que T. Le
*Attorney, Agent, or Firm*—McDermott, Will & Emery

[57] ABSTRACT

An all-around observation device is provided for detecting a field of view having a large solid angle. The all-around observation device comprises an imaging optical system having objective means continuously rotating with a first rotary speed about a first axis and having a rotating imaging path of rays, and a polygon wheel rotating with a second rotary speed and being located in the rotating imaging path of rays. The polygon wheel is provided with beam deflecting means for continuously deflecting the imaging path of rays each time said rotating imaging path of rays passes one polygon face of the polygon wheel, such that a field of view sector is stationary imaged during a finite observation time on a detector having a two-dimensional arrangement of detector elements. A motor is arranged to continuously rotate, with a third rotary speed, the polygon wheel and the objective means about a second axis, which forms an angle with the first axis.

23 Claims, 5 Drawing Sheets

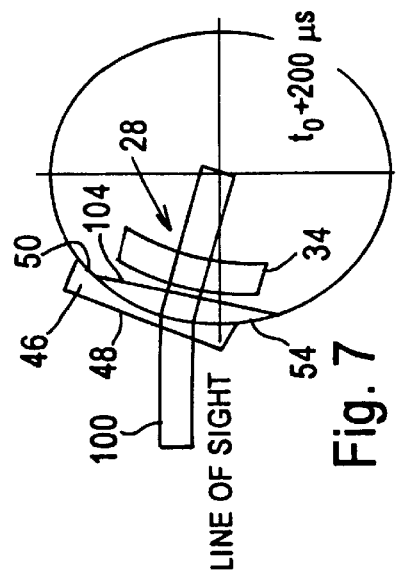
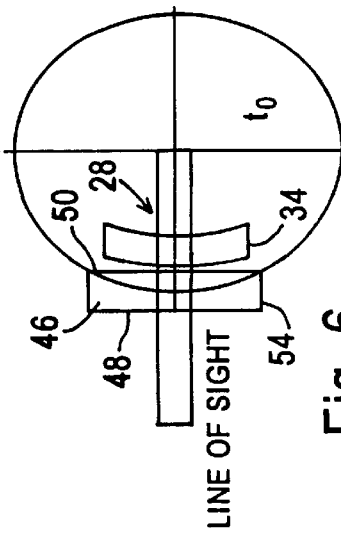
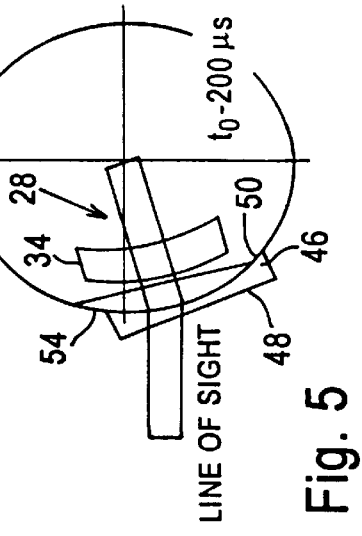
Fig. 7
Fig. 6
Fig. 5
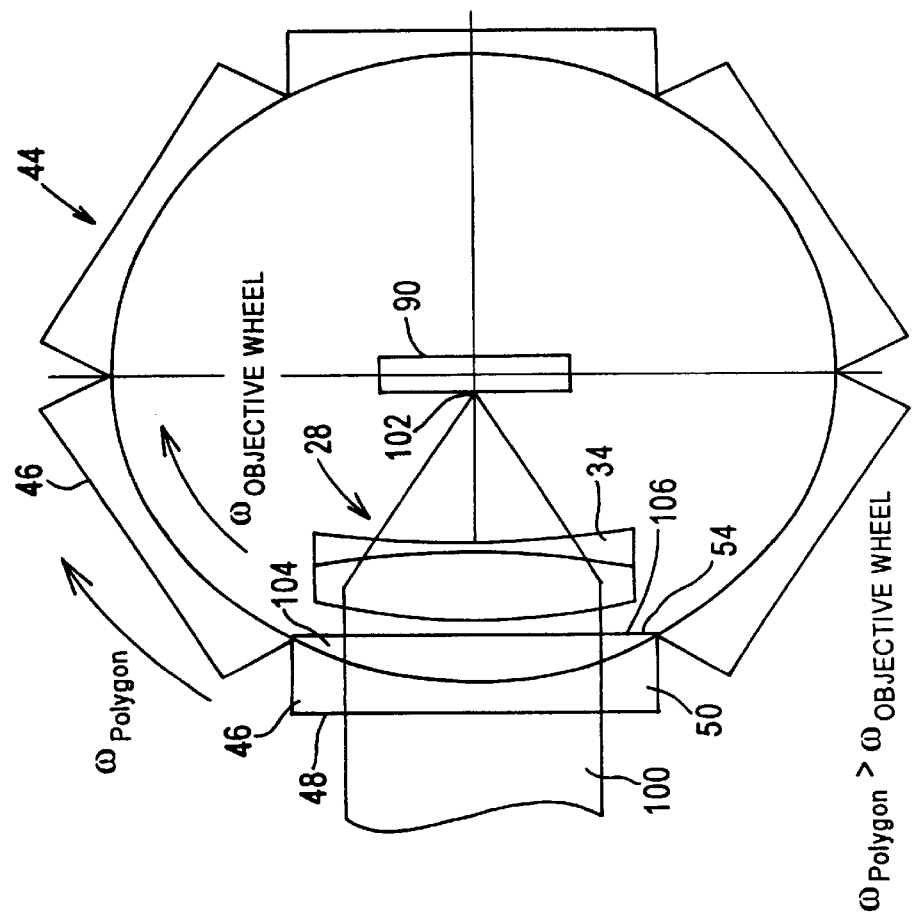
Fig. 4

ALL-AROUND OBSERVATION DEVICE HAVING A ROTATABLE OBJECTIVE ELEMENT

BACKGROUND OF THE INVENTION

This invention relates to an all-around observation device for detecting a field of view having a large solid angle by at least one detector having a two-dimensional arrangement of detector elements.

Such an all-around observation device shall observe, with high spatial resolution, a large field of view, which is larger than half-space. For example, the all-around observation device shall continually observe a region of 360° in azimuth and of −30° to +90° in elevation. This can only be realized by scanning, i.e. in a manner, in which the individual field of view sectors are detected consecutively. This, however, results in two requirements: The scanning has to be effected with sufficently high repetitive frequency. Thus, the field of view has to be scanned in a time as short as possible. Furthermore, however, the detector has to be exposed to each field of view sector for a sufficiently long time.

This problem cannot be solved by using a rigid system of imaging optical system and detector, which rigid system is consecutively directed to individual field of view sectors. A motion over 360° alone would require twelve to sixteen single images when using conventional IR-matrix detectors. To this the elevation steps must be added. Using a scanning procedure similar to Mercator's projection, approximately six hundred images per second have to be made. It is not possible to swing and position the optical system and the detector at this frequency. This is also true in the case when two detectors are used and the frequency can be reduced by half.

Continuous movement of such a rigid system would lead to movement blur to an extent, which is not acceptable.

DESCRIPTION OF THE PRIOR ART

EP-A-0 629 890 discloses an optical all-around seeker device having a first seeker for target detection, which is adapted to continuously scan the field of view. A memory serves for storing the positions of detected targets. A second seeker having a high-resolution image sensor is adapted to be consecutively directed stepwise to the stored positions of the detected targets. The second seeker remains in each of these positions for a sufficiently long observation time.

Different methods generating still pictures during continuous film passage are known in cinematographic and movie techniques.

Furthermore, optical scanning systems are known, with which a stationary total picture is generated during continuous rotation. In this case, detector rows are exposed with very short exposure time.

SUMMARY OF THE INVENTION

An object of the present invention is to provide an all-around observation device, which is able to detect a large field of view fast and with high resolution, the detector being exposed sufficiently long time for each image and movement blur being avoided.

According to the invention this object is achieved by an all-around observation device for detecting a field of view having a large solid angle by at least one detector having a two-dimensional arragement of detector elements, comprising:

(a) an imaging optical system having objective means continuously rotating with a first rotary speed about a first axis and having a rotating imaging path of rays; and (b) a polygon wheel provided with polygon faces, rotating with a second rotary speed and being located in the rotating imaging path of rays, which polygon wheel is provided with beam deflecting means for continuously deflecting the imaging path of rays each time said rotating imaging path of rays passes one polygon face of said polygon wheel, such that a field of view sector is stationary imaged on the detector during a finite observation time.

By means of the rotating objective means a strip of the field of view is scanned along a plane perpendicular to the first axis. This can, for example, be a scanning of the field of view in elevation. During this scanning the objective means are rotated continuously. They do not have to be stopped and accelerated again in order to generate a temporarily still image. This last function is effected by the beam deflecting means of the polygon wheel. These means rotate at higher rotary speed than the objective means.

Each face of the polygon wheel deflects the path of rays from the objective means, when it passes the objective means, such that a still image of a field of view sector just detected is temporarily generated at the detector. This avoids movement blur. The polygon wheel rotates likewise continuously.

In order to scan the total field of view, the all-around observation device can comprise means for continuously rotating, with a third rotary speed, the polygon wheel and the objective means about a second axis, which forms an angle with the first axis.

Modifications of the invention are subject matter of the sub-claims.

BRIEF DESCRIPTION OF THE DRAWING

An embodiment of the invention will now be described in greater detail with reference to the accompanying drawings.

FIG. 4 is a schematic illustration of an all-around observation device and serves for better illustration of the function thereof.

FIG. 5 is a schematic illustration of the objective means and the part of the polygon wheel just active at the time $t_0 - 200\ \mu s$, $t_0$ being the time illustrated in FIG. 4.

FIG. 6 is an illustration similar to FIG. 5 and shows the arrangement at the time $t_0$.

FIG. 7 is an illustration similar to FIG. 5 and shows the arrangement at the time $t_0 + 200\ \mu$.

DESCRIPTION OF THE PREFERRED EMBODIMENTS

Figure 1:
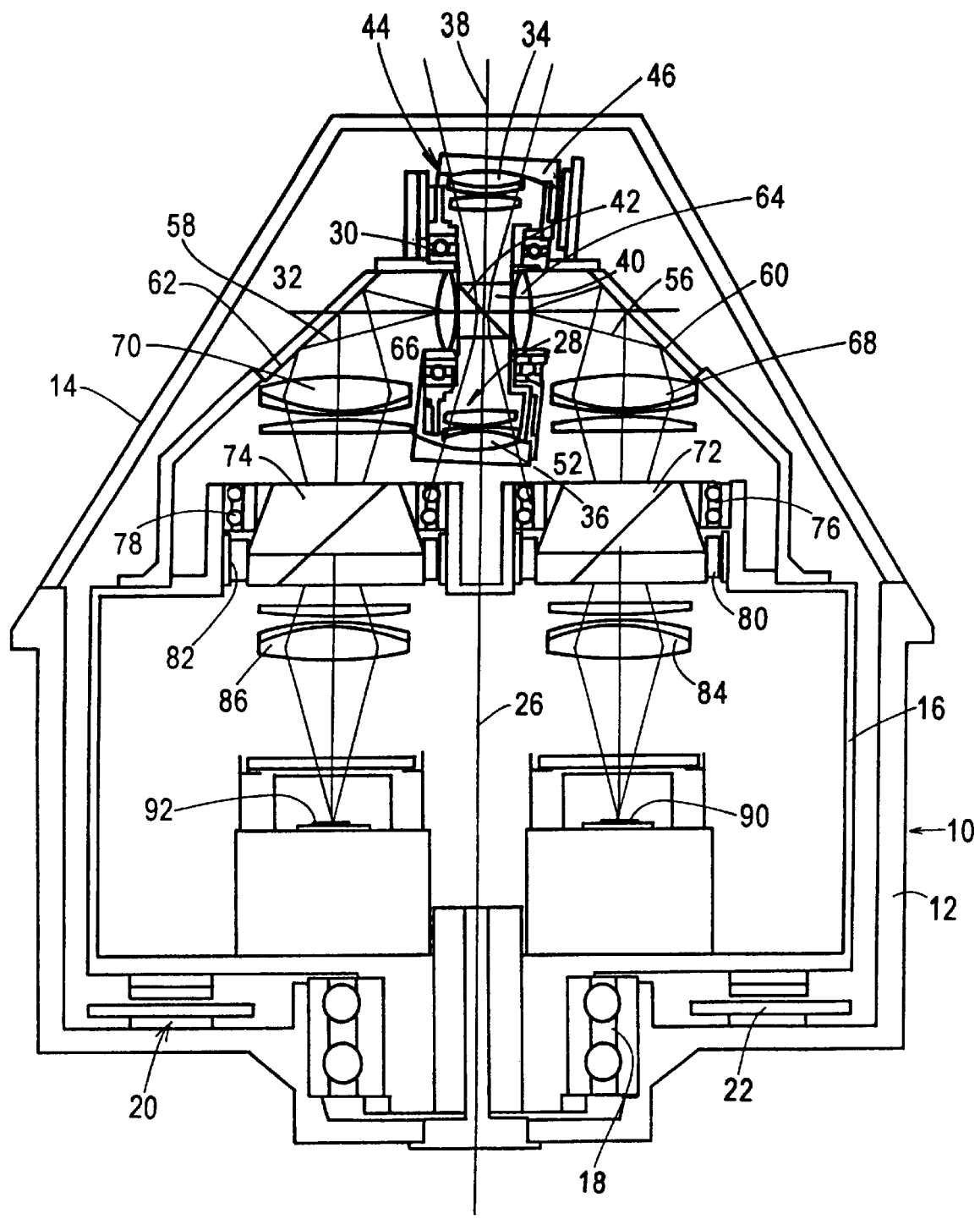
FIG. 1 shows a vertical section through an all-around observation device.

Referring to FIG. 1, there is shown a housing 10. The housing has a pot-shaped bottom part 12 and a cap 14 transparent to infrared radiation and formed as a truncated cone. A main frame 16 is rotatably mounted through bearings 18 in the bottom part 12. A motor 20 is adapted to drive the main frame 16 relative to the stationary housing 10 about a vertical "second" axis 26. The motor 20 has an annular disc-shaped stator 22 located in the bottom of the bottom part 12 and an annular disc-shaped rotor 24 located on the main frame 16.

Figure 2:
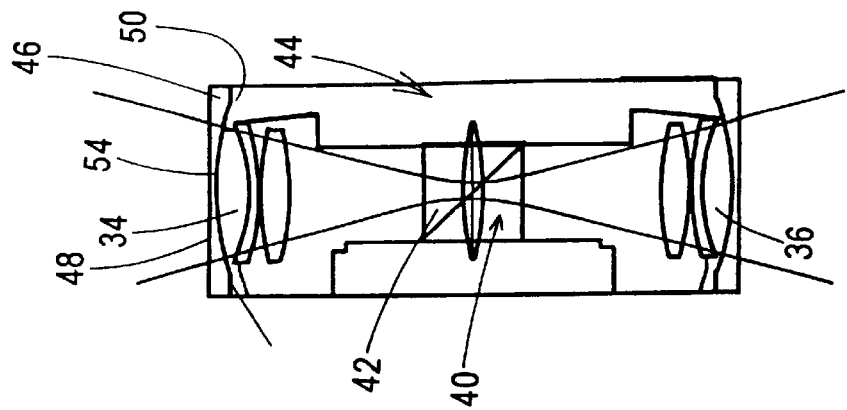
FIG. 2 shows the objective means and the polygon wheel in detail.

"Objective means" 28 are rotatably mounted about a "first" axis 32 through a bearing 30 in the main frame 16. The first axis 32 extends perpendicularly to to the "second" axis 26, that means horizontally. The "objective means" consist of an objective wheel having two diametrically opposite objectives 34 and 36. As can be seen best from FIG. 2, a prism 40 is located in the intersection point of the first axis and the aligned optical axes of the objectives 34 and 36. The prism 40 rotates together with the objectives 34 and 36 of the objective means 28.

The prism 40 is cube-shaped and has a parting plane connecting two opposite edges. The parting plane divides the prism 40 into two parts having equal angle triangular shape. The parting plane forms a narrow gap. Thus, the rays incident along the optical axes 38 are totally reflected. Thus, the parting plane constitutes a first deviation mirror surface 42, which is reflective on both sides. An imaging path of rays from the objective 34 is deflected by this first deviation mirror surface 42 by 90° to the right in FIG. 1 and extends along the first axis 32. An imaging path of rays from the objective 36 is deflected by the first deviation mirror surface 42 by 90° to the left in FIG. 1 and extends likewise along the first axis 32 but in opposite direction with respect to the imaging path of rays from the objective 34.

A likewise rotating polygon wheel 44 rotates about the rotating objective means 28. The polygon wheel 44 has a circular array of plano-concave lenses 46. The diameters of the lenses 46 are larger than the entrance aperture of the objectives 34 and 36. As can be seen best from FIG: 2, the plano-concave lenses 46 have a plane outer surface 48 and a concave-spherical inner surface 50. The polygon wheel 44 is rotatably mounted on a bearing 52. The central plane of the polygon wheel 44 forms a small angle with the central plane of the objective means 28. Thus, the polygon wheel 44 also rotates about an axis, which forms a small angle with the first axis 32, about which the objective means 28 rotate.

The concave-spherical inner surfaces 50 of the plano-concave lenses 46 are curved about the intersection point of the first axis 32 and the (not illustrated) axis of rotation of the polygon wheel 44. The front or outer surfaces 54 of the objectives 34 and 36 are likewise curved about the intersection point of these axes and form narrow air gaps together with the inner surfaces of the plano-concave lenses 46.

The two paths of rays 56 and 58 from the two objectives 34 and 36 deviated at the deviation mirror surface 42 to the right and to the left in FIG. 1, respectively, are deviated once again by 90° by second deviation mirror surfaces 60 and 62, respectively, such that they now extend parallelly to the second axis 26 downwards in FIG. 1. One field lens 64 and 66, respectively, is located in each of the paths of rays 56 and 58 between the first deviation mirror surface 42 and the second deviation mirror surface 60 and 62, respectively. Thus, the paths of rays are passing one objective 68 and 70, respectively, and "image rotating means" in the form of a Pechan prism 72 and 74, respectively. The Pechan prisms 72 and 74 are rotatably mouted in bearings 76 and 78, respectively, about axes, which extend parallelly to the second axis 26. Each of the Pechan prisms 72 and 74 is driven by a motor 80 or 82, respectively, with a rotary speed, which is equal to half the driving rotary speed of the objective means 28, i.e. the objective wheel. A further objective 84 and 86, respectively, is arranged in each of the imaging paths of rays 56 and 58 behind the Pechan prism 72 and 74, respectively. Through the deviation mirror surfaces and the further objectives, each of the objectives 34 and 36, respectively, generates an image of a field of view sector 88 (FIG. 3) in the plane of an associated detector 90 and 92, respectively. The detectors 90 and 92 are IR-matrix detectors having a two-dimensional arrangement of infrared-sensitive detector elements. The images of the field of view sectors 88, which would rotate in the image plane due to the rotation of the deviation mirror surface 42, are held stationary relatively to the detectors 90 and 92, respectively, by the Pechan prism 72 or 74.

The function of the described all-around observation device is as follows:

When the polygon wheel is located with one plano-concave lens 46 in front of the objective 34 or 36 of the objective means, then the corresponding lens element of the plano-concave lens 46 acts as a prism with variable wedge angle. Thus, the imaging path of rays 56 and 58, respectively, of the objective for imaging a determined field of view sector is deflected relatively to the objective with a continuously variable deviation angle. Or in other words: An impinging parallel beam of rays is deflected relatively to the optical axis of the objective 34 and 36. However, the objective 36 is rotating. The deflection of the imaging path of rays due to the variable wedge effect of the plano-concave lens 46 can now be tuned to the rotation of the objective 34 or 36, such that the image of the field of view sector 88 stands still during a determined time relatively to the detector 90 and 92, respectively. The time, during which one plano-concave lens 46 of the polygon wheel 44 leaves the entrance aperture of the objective 34 or 36 completely free, can be used as exposure time for the detectors.

In the illustrated embodiment the objective means 28 rotate about a horizontal first axis 32. Thereby, they substantially generate a strip of individual images along a vertical axis intersecting the second axis. However, this is not exactly true, because the main frame 16 including the objective means 28 also rotates about the second axis 26. During one revolution of the objective means 28, the main frame is further rotated by an angle, which corresponds to the angle, under which the field of view sectors 88 appear. Thus, the rotation rate of the optical axes of the objective do not only have a radial component in the direction of the axis 32 but also an additional azimuth component in the direction of the axis 26. The lenses 46 of the polygon wheel 44 have to follow this movement. Therefore, the polygon wheel 44 is slightly tilted with respect to the objective means 28, such that the velocity of the lenses 46 points in the direction of the velocity of the optical axes of the objectives 34 and 36, respectively.

In order to scan the field of view to be observed in as short time as possible with as long exposure times as possible for the detection of the individual field of view sectors 88 by the detectors, the field of view sectors and the number of the polygon elements (lenses 46) of the polygon wheel 44 are tuned very carefully to each other. In order to sufficiently stabilize the images on the detectors 90 and 92 durch a sufficiently long exposure time, the polygon wheel 44 has to rotate faster than the objective means 26. The required rotary speeds are related to each other as a function of the refractive index n of the plano-concave lenses 46. It is $$\omega_{polygon} = \omega_{objective\ wheel} n/(n-1).$$

Therein n is a matter constant, which cannot assume any arbitrary value. The scanning is very effective when:

$$\frac{k_{step} \cdot k_{polygon}}{k_{field\ of\ view}} = n - 1$$

Therein $k_{step}$ is the number of field of view steps until the next possibility of imaging a field of view sector 88 by an objective 34 or 36. $k_{polygon}$ is the number of polygon elements or lenses 46. $k_{field\ of\ view}$ is the number of field of view sectors, which shall be detected in a strip of 360°.

Figure 3:
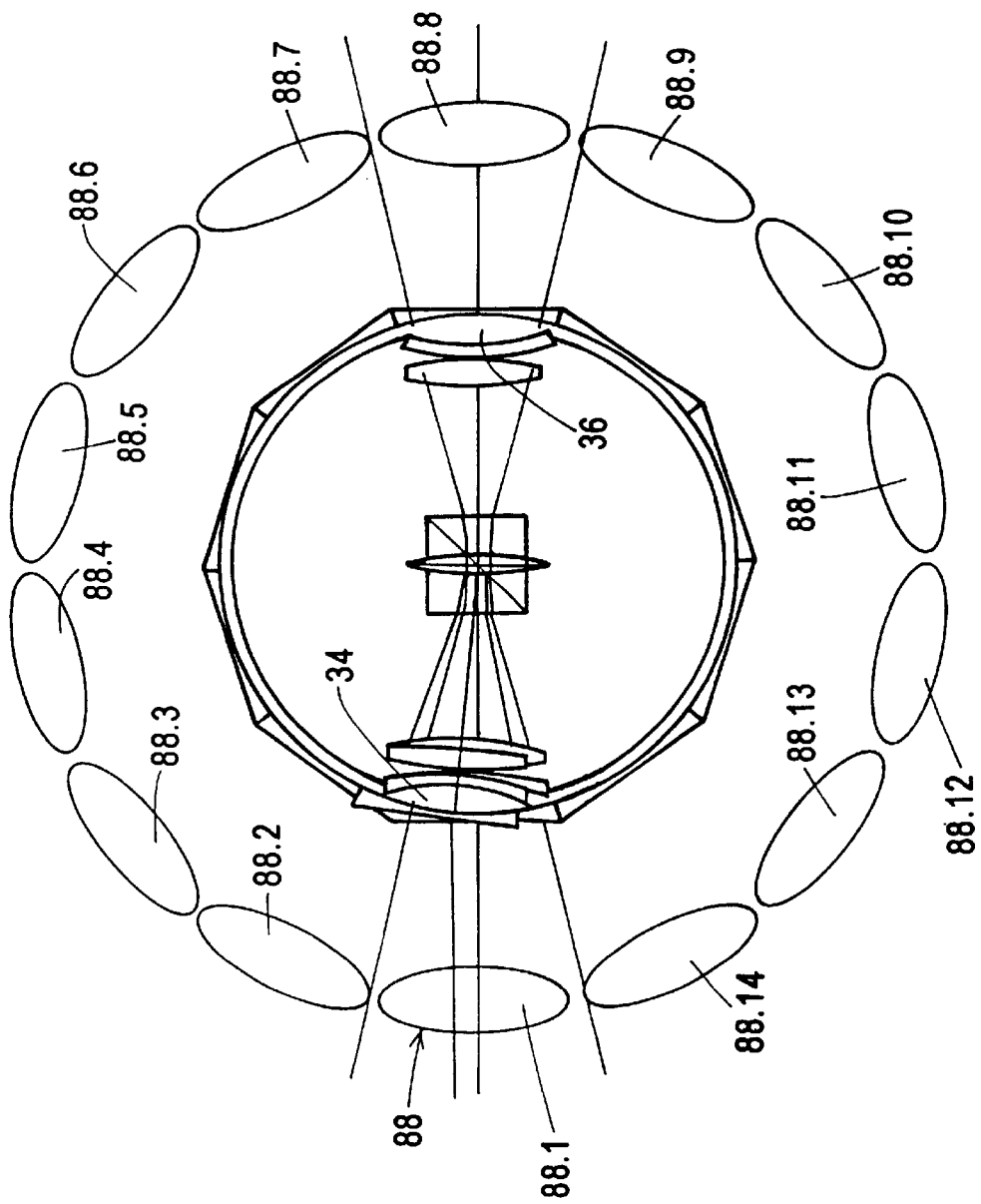
FIG. 3 shows an axial view of the objective means and of the polygon wheel with the associated field of view sectors.

$k_{step}$ should have a value of 2. A value of 1 cannot be achieved, because, after a field of view sector 88 has been imaged by an objective, e.g. 34, at first the lens 46 of the polygon wheel 44 cooperating with the objective 34 for stabilization of the image has to be changed. A value greater than 2 would have a negative influence on the fast scanning of the field of view to be observed. As illustrated in FIG. 3, using two objectives 34 and 36, each objective 34 and 36 detects every second one of the field of view sectors 88 in a 360°-strip, these series of field of view sectors 88 being interpenetrative. In FIG. 3 $k_{field\ of\ view}$=14 field of view sectors 88.1 to 88.14 shall be scanned in a 360°-strip. Starting from the position of the objective wheel illustrated in FIG. 3, the objective 34 detects a field of view sector 88.1 and the objective 36 detects at the same time the diametrically opposite field of view sector 88.8. When the next possible imaging takes place, the objective 34 detects the next but one field of view sector 88.3 and the objective 36 detects the field of view sector 88.10. In FIG. 3 the field of view sectors detected by the objective 34 are illustrated by unbroken lines and the field of view sectors detected by the objective 36 are illustrated by dotted lines.

In the illustrated embodiment the number $k_{polygon}$ of the polygon elements or lenses 46 is ten. Using two objectives, $k_{ploygon}$ should be an even number. This enables the rays to be deviated as illustrated through the first deviation mirror surface 42 reflective on both sides.

Using two objectives, $k_{field\ of\ view}$ has to assume a number of, for example, 10, 14 or 18, which only can be divided by two once. In the embodiment, in which $k_{field\ of\ view}$=14, i.e. fourteen field of view sectors 88.1 to 88.14 in a strip of 360°, and the polygon has ten polygon elements or lenses 46, a refractive index n of 2,425 results. Taking the adjustement for the azimuth movement into consideration, the refractive index required for the linses 46 is increased to 2,437. The material ZnSe having a refractive index of n=2,431 can be use for the lenses.

The rotary speeds in the described all-around observation device have to be controlled very exactly. Furthermore, the position of a rotating unit has to be known at each time, in order to ensure a correct relation. However, the basic rotary speed of the objective wheel can be varied arbitrarily in order to achieve higher repeating rates or longer integration times, if the rotary speeds of the other units (polygon wheel 44, main frame 16 and Pechan prisms 72 and 74) also are varied according to the required relations of the speeds. Therefore, in particular synchronous motors having permanently energized rotors are suitable for use as driving mechanism.

FIG. 4 is a schematic illustration of the polygon wheel 44 and the objective means 28, which are represented here by one single objective 34. The objective 34 collects a parallel light beam 100 from the object field located at infinity to the detector 90. In FIG. 4, the polygon wheel 44 and the objective means 44 or the objective 34, respectively, rotate clockwise in the same direction. Therein, the rotary speed $\omega_{prism}$ of the polygon wheel 44 is higher than the rotary speed $\omega_{objective}$ of the objective 34. FIG. 4 shows the arrangement at a time $t_0$, at which the optical axes of the objective 34 and of the plano-concave lens 46 of the polyon wheel 44 are aligned and the parallel light beam 100 is collected in a point 102 of the beam axis. This position is also illustrated in the schematic illustration of FIG. 6.

Before that, the polygon wheel 44 was located in a position as illustrated in FIG. 5 for the time $t_0$–200 $\mu$s. As can be seen from FIG. 5, in this position, the plano-concave lens 46 of the polygon wheel 44 forms a wedge together with the front plano-convex lens 104 of the objective 34. The plane surface 48 of the plano-concave lens 46 of the polygon wheel 44 and the plane surface 106 of the plano-convex lens 104 form an angle, the angle point of which is located at the bottom of FIG. 5. Thus, the parallel light beam 100 is deflected upwards, as illustrated. The parallel light beam 100 is collected in the same point of the detector 90 as in the arrangement according to FIGS. 4 and 6.

After the position of FIG. 4 and 6, at a time $t_0$+200 $\mu$s, the arrangement is in the position illustrated in FIG. 7. Also in this position, the plano-concave lens 46 of the polygon wheel 44 forms a wedge together the plano-convex lens 104 of the objective 34. The plane surface 48 of the plano-concave lens 46 of the polygon wheel 44 and the plane surface 106 of the plano-convex lens 104 again form an angle, the angle point of which now, however, is located at the top of FIG. 7. Thus, the parallel light beam 100 is deflected downwards, as illustrated. Also in this position, the parallel light beam 100 is collected in the same point of the detector 90 as in the arrangement according to FIGS. 4 and 6.

Due to the optical wedge effect of the cooperating lenses 46 and 104 of the polygon wheel 44 and the objective 34, thus, with continuous rotation of the polygon wheel 44 as well as of the objective 34, the detected image remains in position relatively to the detector 90 during a sufficiently long time.

FIG. 8 to 11 show a modified embodiment of the all-around observation device. In this embodiment, the objective means 110 and the polygon wheel 112 rotate in opposite directions. The objective means 110 rotate clockwise. The polygon wheel 112 rotates counter-clockwise. The rotary speed $\omega_{prism}$ of the polygon wheel 112 is lower than the rotary speed $\omega_{objective}$ of the objective means 110. In the schematic illustration of FIG. 8, the objective means 110 are formed by an objective 114. Herein, the objective 114 consists of a two-piece lens 116 and a plano-concave lens 118 arranged spaced from and on the object side of this lens 116. The plano-concave lens has a plane surface 120 on the object side and a concave surface 122 on the image side. The concave surface is again curved about the intersection point of the the axes of rotation of the object means 110 and the polygon wheel 112. In this embodiment the polygon wheel 112 has plano-convex lenses 124. The plano-convex lenses 124 each have an inner plane surface 126 on the image side and an outer convex surface 128 on the object side. The convex surfaces 128 are also curved about the intersection point of the axes of rotation of the objective means 110 and the polygon wheel 112. The radius of curvature thereof is substantially matched to the radius of curvature of the concave surface 122. The polygon wheel 112 extends between the two-piece lens 116 and the plano-concave lens 118 of the objective 114. A narrow air gap is formed between the concave surface 122 of the objective 114 and the convex surface 128 of the polygon wheel 112.

Also in this arrangement the plano-concave lens 118 of the objective 114 and the plano-convex lens 124 of the polygon wheel 112 form an optical wedge having variable angle. In the position illustrated in FIGS. 8 and 10 the optical axes of the plano-concave lens 118 and of the objective 114 coincide. Then the wedge angle is zero and the two lenses 118 and 124 complement one another to a plane-parallel plate. An impinging parallel light beam 130 is just collected at a point 132 of the detector. This point of time is again designated by $t_0$.

Figure 9:
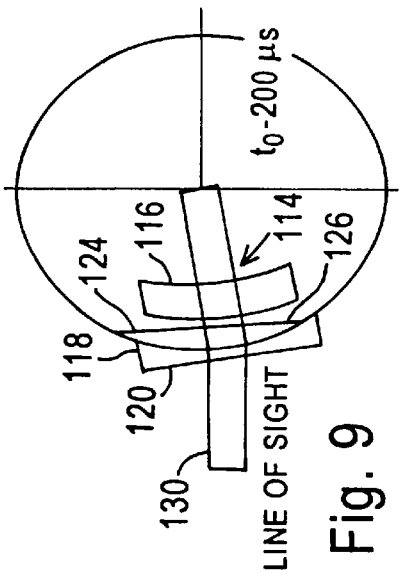
FIG. 9 is a schematic illustration of the objective means and the part of the polygon wheel just active at the time $t_0 - 200\ \mu s$, to being the time illustrated in FIG. 8.
Figure 8:
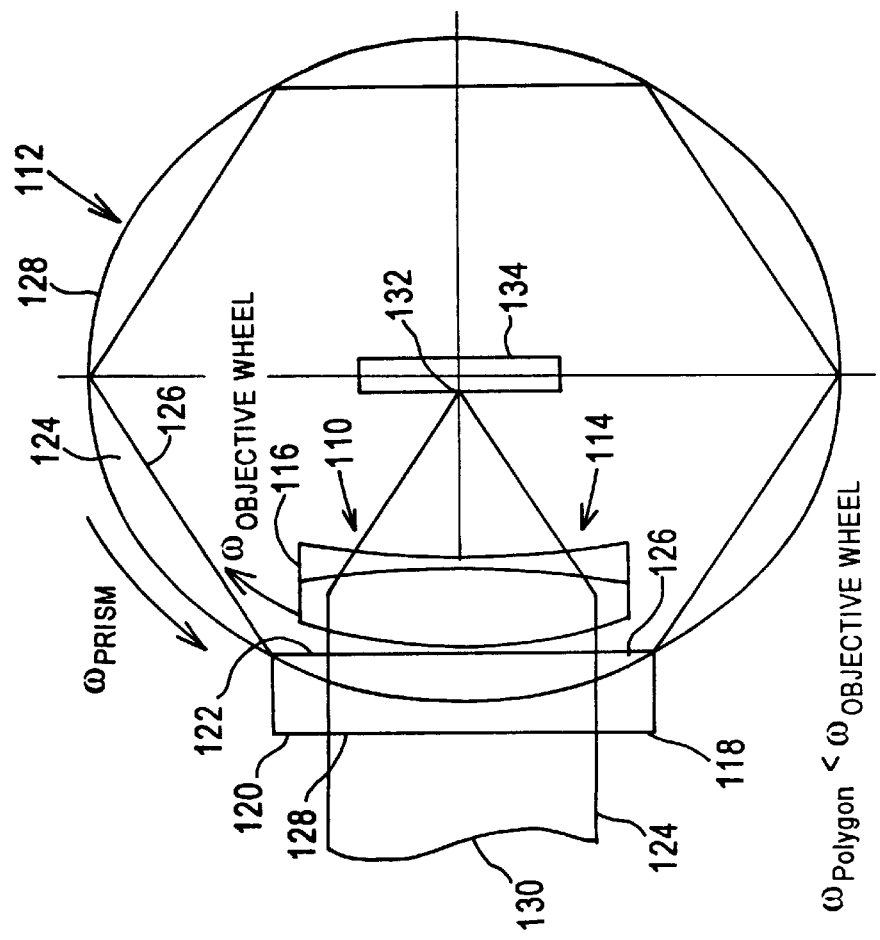
FIG. 8 is a schematical illustration similar to FIG. 4 and shows a modification of the all-around observation device, in which the polygon wheel and the objective means rotate in opposite directions.

At the time $t_0-200\ \mu s$, which is illustrated in FIG. 9, the two lenses 118 and 124 form an optical wedge again. The plane surfaces 120 and 126 form an angle, the angle point of which is located at the bottom of FIG. 9. Thus, the parallel light beam 130 is deflected upwards in FIG. 9 and collected in the same point 132 on the detector 134 as in the arrangement according to FIGS. 8 and 10.

Figure 11:
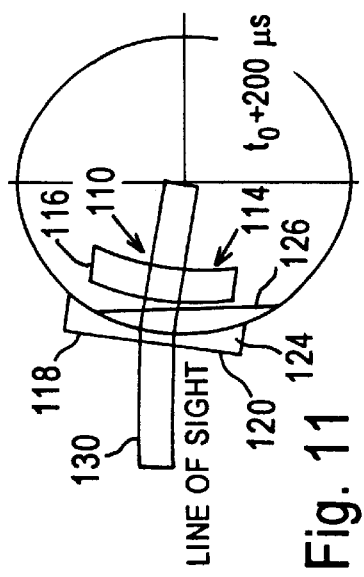
FIG. 11 is an illustration similar to FIG. 9 and shows the arrangement at the time $t_0 + 200\ \mu s$.
Figure 10:
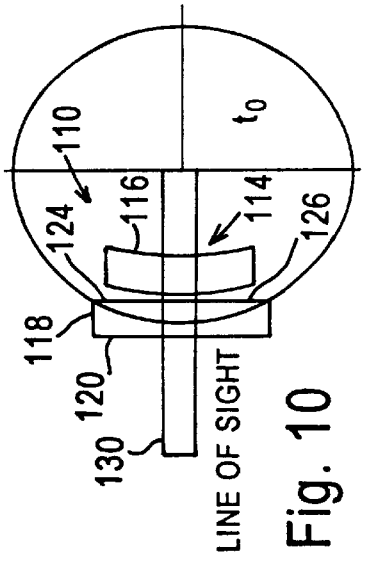
FIG. 10 is an illustration similar to FIG. 9 and shows the arrangement at the time $t_0$.

In a corresponding manner, at the time $t_0+200\ \mu s$, which is illustrated in FIG. 11, the two lenses 118 and 124 form an optical wedge again. The plane surfaces 120 and 126 form an angle, the angle point of which is now located at the top of FIG. 11. Thus, the parallel light beam 130 is deflected downwards in FIG. 11 and again collected in the same point 132 on the detector 134 as in the arrangement according to FIGS. 8 and 10.

When the directions of rotation of the polygon wheel 112 and the objective means 110 are opposite, the rotary speed of the polygon wheel 112 and of the objective means 110 are chosen to be $$\omega_{polygon} \omega_{objective\ wheel}(n-2)/(n-1).$$

When the rotary speed of the polygon wheel 112 is sufficently low, an additional prism can be associated with each polygon element (each plano-convex lens 124), these prisms deflecting the optical axis alternately to one side and to the other side out of the plane of the rotating objective means 110. Then, during one revolution of the objective means 110, two adjacent strips of scanning fields can be detected. Thus, the objective means 110 detects a field of view of double width.

Figure 12:
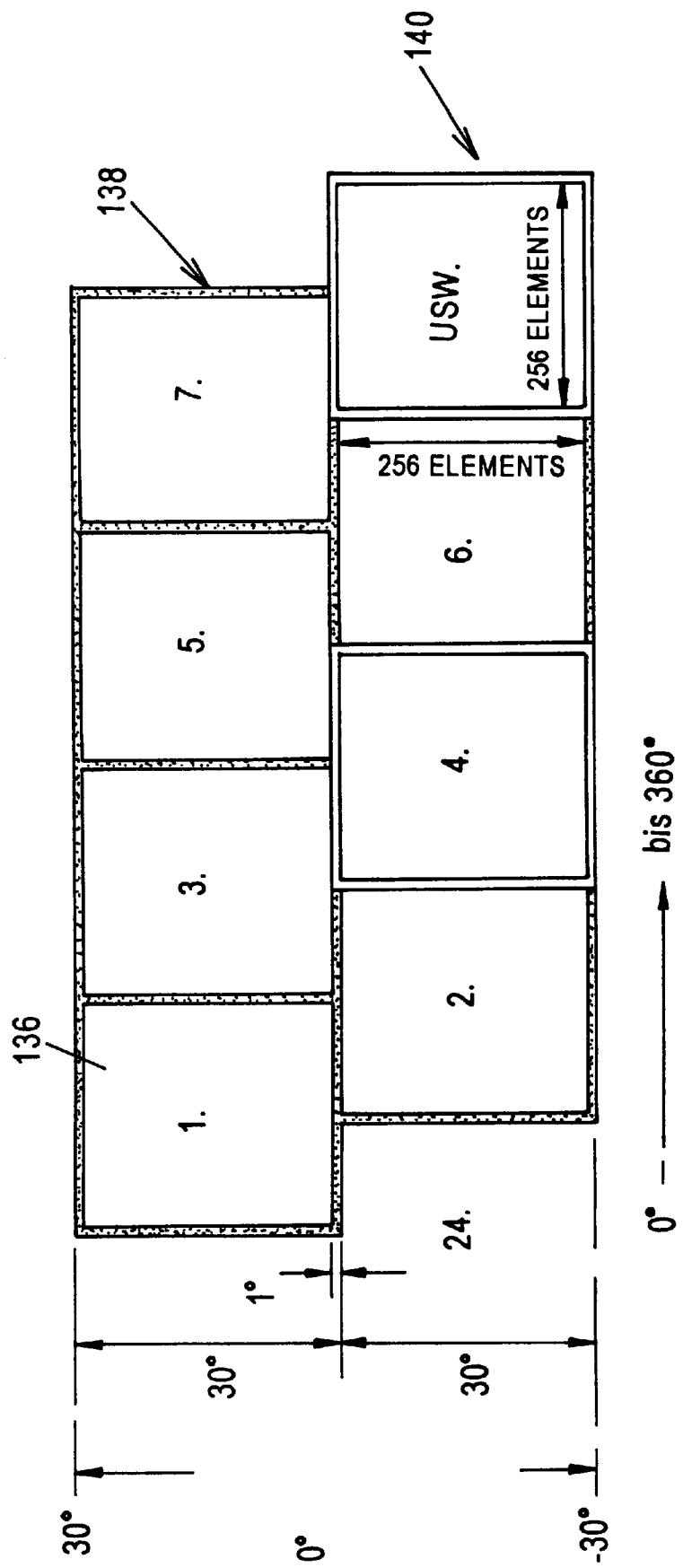
FIG. 12 illustrates the scanning of two adjacent strips of the field of view during one revolution of the objective means using two detectors, illustrated substantially as in FIG. 1.

This is illustrated in FIG. 12. The individual scanning fields 136 consecutively detected in the two strips 138 and 140 are illustrated therein. Each scanning field 136 include for example 256 image elements or pixels.

I claim:

1. An all-around observation device for detecting a field of view having a large solid angle by at least one detector having a two-dimensional arrangement of detector elements, comprising:

(a) an imaging optical system having objective means continuously rotating with a first rotary speed about a first axis and having a rotating imaging path of rays; and (b) a polygon wheel provided with polygon faces, rotating with a second rotary speed and being located in said rotating imaging path of rays, which polygon wheel is provided with beam deflecting means for continuously deflecting said imaging path of rays each time said rotating imaging path of rays passes one polygon face of said polygon wheel, such that a field of view sector is stationary imaged on said detector during a finite observation time.

2. The all-around observation device of claim 1, further comprising means for continuously rotating, with a third rotary speed, said polygon wheel and said objective means about a second axis, which forms an angle with said first axis.

3. The all-around observation device of claim 2, wherein said first axis and said second axis are mutually perpendicular.

4. The all-around observation device of claim 1, wherein said objective means and said polygon wheel rotate in the same direction of rotation, said rotary speed of said polygon wheel being higher than said rotary speed of said objective means.

5. The all-around observation device of claim 4, wherein said beam deflecting means of said polygon wheel are formed by plano-concave lenses.

6. The all-around observation device of claim 4, wherein the ratio of said rotary speeds of said polygon wheel and of said objective means is $n/(n-1)$, n being the refractive index of said plano-concave lenses of said polygon wheel.

7. The all-around observation device of claim 6, wherein said plano-concave lenses have concave inner surfaces, which are curved about a point located on said axis of rotation of said objective means.

8. The all-around observation device of claim 7, wherein said objective means have a lens rotating within said polygon wheel and having a front face, which likewise is curved about a point located on said axis of rotation and forms narrow air gaps with said inner surfaces of said plano-concave lenses of said polygon wheel.

9. The all-around observation device of claim 1, wherein said objective means and said polygon wheel rotate in opposite directions of rotation, said rotary speed of said polygon wheel being lower than said rotary speed of said objective means.

10. The all-around observation device of claim 9, wherein:

(a) said polygon wheel is formed by plano-convex lenses having convex outer surfaces; and (b) said objective means, radially outside said polygon wheel, are provided with a plano-concave lens having a concave inner surface;

(c) said outer surfaces of said plano-convex lenses of said polygon wheel and said inner surfaces of said objective means are curved about a common point located on said first axis.

11. The all-around observation device of claim 10, wherein the ratio of said rotary speeds of said polygon wheel and of said objective means is $(n-2)/(n-1)$, n being the refractive index of said plano-convex lenses of said polygon wheel.

12. The all-around observation device of claim 1, wherein said imaging optical system have a first deviation mirror surface rotating about said second axis and adapted to deviate said path of rays in a direction extending along said first axis.

13. The all-around observation device of claim 12, wherein said imaging optical system further comprises:

(a) a second deviation mirror surface arranged at said first axis and adapted to deviate said path of rays radially deviated by said first deviation mirror surface in a direction parallel to said second axis; and (b) image rotating means adapted to keep the image of said field of view sector permanently aligned to a stationary arranged detector.

14. The all-around observation device of claim 13, wherein said imaging optical system has a field lens located between said first deviation mirror surface and said second deviation mirror surface.

15. The all-around observation device of claim 13, wherein said imaging optical system comprises a further imaging lens system located in said imaging path of rays between said second deviation mirror surface and said image rotating means.

16. The all-around observation device of claim 15, wherein said imaging optical system comprises a further imaging lens system located in said imaging path of rays between said image rotating means and said detector.

17. The all-around observation device of claim 9, wherein said image rotating means are formed by a Pechan prism, which is rotatably mounted and driven at half said rotary speed of said objective means rotating about said first axis.

18. The all-around observation device of claim 1, wherein:
   (a) said rotating objective means have a pair of objectives located diametrically opposite each other with respect to said first axis of rotation;
   (b) two detectors are provided; and
   (c) said field of view sectors detected by said two objectives are imaged upon said two detectors by imaging optical systems.

19. The all-around observation device of claim 18, wherein:
   (a) said first deviation mirror surface has two reflective sides, such that said two imaging paths of rays coming from said two objectives are deviated in opposite directions by said two sides of said first mirror surface; and
   (b) imaging means are provided for each of said imaging paths of rays, each of said imaging means being adapted to generate an image of said associated field of view sector on one of said detectors.

20. The all-around observation device of claim 19, wherein said first mirror surface reflective on both sides is formed by totally reflective surfaces of a two-piece prism.

21. The all-around observation device of claim 1, wherein said polygon wheel has a center plane and said objective means has a center plane, said two center planes forming an angle.

22. The all-around observation device of claim 1, wherein said detector is an IR-matrix detector.

23. The all-around observation device of claim 10, wherein additional detecting means are associated with each of said plano-convex lenses of said polygon wheel, these prisms deflecting the optical axis alternately to one side and to the other side out of the plane of said rotating objective means.

* * * * *